Figure 1:
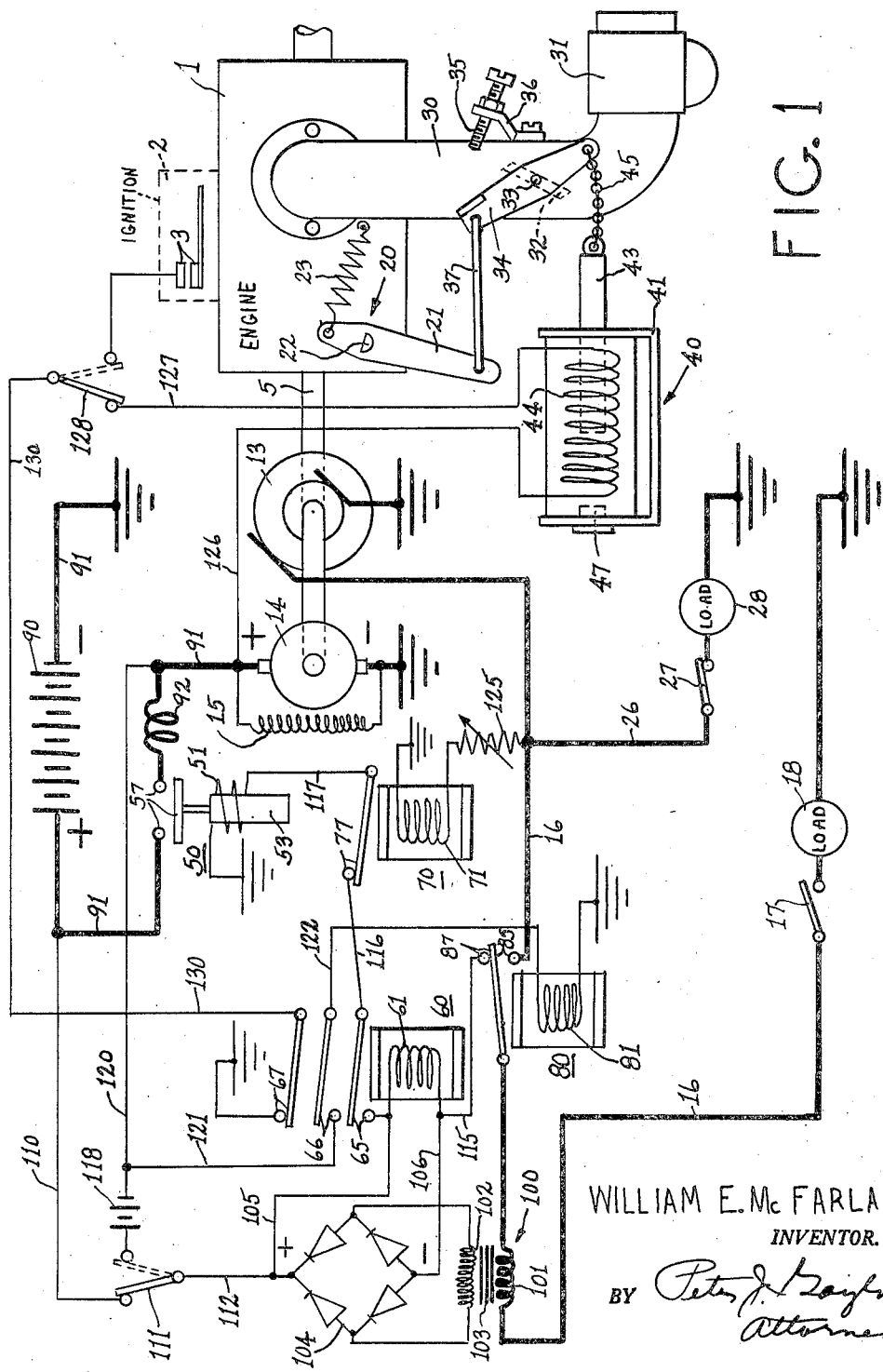

WILLIAM E. McFARLAND
INVENTOR.

Aug. 27, 1957   W. E. McFARLAND   2,804,551
RELAY CONTROL SYSTEM FOR ENGINE GENERATOR SETS
Filed May 21, 1956   3 Sheets-Sheet 2

WILLIAM E. McFARLAND
INVENTOR.

BY *Peter J. Taylor*
*Attorney*

Aug. 27, 1957 W. E. McFARLAND 2,804,551
RELAY CONTROL SYSTEM FOR ENGINE GENERATOR SETS
Filed May 21, 1956 3 Sheets-Sheet 3

WILLIAM E. McFARLAND
INVENTOR.
BY *[signature]*
Attorney

United States Patent Office 2,804,551
Patented Aug. 27, 1957

2,804,551

RELAY CONTROL SYSTEM FOR ENGINE GENERATOR SETS

William E. McFarland, Nutley, N. J.

Application May 21, 1956, Serial No. 586,051

13 Claims. (Cl. 290—30)

This invention falls in the field of automatic load-responsive relay systems for engine-generator sets (electric plants) as used for individual applications where demand is intermittent. The term "automatic relay control system" as used herein designates that portion of the entire engine control system which comprises at least two electromagnetic switching relays and which are the two relays performing the basic control functions in response to the connection and disconnection of the load that is served by the load generator. These particular relays enable the automatic control of the engine entirely from the act of opening and closing load appliance switches and without necessity for special remote control wires and remote switches that are separate and apart from the load circuit. In certain applications, the control effect of the two relays is to obtain the starting and acceleration of the engine when load is connected initially and the stopping of the engine when all load is disconnected. In other applications, the engine is not entirely stopped while operating under automatic control, and may not even have a battery for starting purposes, and the control effect of the relays is associated only with an electrically energized idling system, such as a solenoid electromagnet acting on the fuel supply of the engine. The control effect thereof results in idling the engine at slow speed when all load is disconnected, and in accelerating the engine at load speed when a new load is connected in the load circuit.

The two relays comprising the said portion of the engine control system may be called respectively the load-responsive relay and the voltage-responsive relay. The function of the voltage-responsive relay is more directly concerned with speed than with voltage, so that it would also be proper to refer to this unit as a speed-responsive relay. In the present invention, this speed-responsive relay necessarily is an electromagnetic type of relay, and, if the energization is by D. C., it will be necessarily strictly responsive to voltage. If it is energized by A. C., it will be necessarily either a voltage-relay or a frequency relay in which the voltage rise or the frequency rise would be closely related. This speed-responsive relay hereinafter will be designated as a voltage-responsive or voltage relay.

The load-responsive relay (hereinafter called the load relay) will have one or more operating windings according to modifications of design. The control effect of the load relay (upon de-energization or energization of its winding or windings) is manifested by at least deceleration of the engine (upon de-energization of the relay), i. e., reduction of the engine speed or stopping of the engine, or at least acceleration of the engine (upon energization of the relay), i. e., starting of the engine and acceleration thereof if the engine is stopped, or acceleration of the engine if already running. In some instances, the load relay even may comprise a system of two relays, each with an operating winding but serving the equivalent function of a single relay. If the load relay has only one operative winding, the one winding will at different times be energized from two different sources. In any event, one operating winding will be energized at initiation of load, and this energization is by means of an initial energization circuit which may be either a battery circuit or a generated current circuit when the control effect is exerted on an engine-idling apparatus.

This initial energization circuit necessarily will be a battery circuit in engine start-and-stop systems. This circuit is one which is closed by the act of closing a load appliance switch. When initially energized, the load relay provides the switching status to effect the cranking and acceleration of the engine, or, in the event an idling device is used, it merely effects the acceleration of the engine. The voltage relay (which may be a single relay or may comprise a small relay for control functions and a larger relay or contactor for the switching operations) becomes gradually energized during engine acceleration and becomes operatively energized only when the engine has accelerated well toward load speed. The function of the voltage relay at load speed is to effect interruption of the initial energization circuit of the load relay, and at the same time effect the closing of the load circuit whereby the load generator thereafter serves the load. The term "same time" does not preclude the time element of a switching interval which usually may be encountered in such an operation.

In order to maintain engine operation at load speed, a holding energization circuit for the load relay is provided. The latter circuit derives holding energization from the load circuit current flow itself, either by passing some or all of the load circuit current directly through an operating winding of the load relay, or by transformer action as will be described hereinafter. Opening of all load appliance switches necessarily terminates the energization of the load relay, thereby reversing the switching status to exert a control effect so that the engine speed is reduced or the engine is stopped.

Heretofore, relay control systems used for the purpose described above have been used for automatic start-and-stop of the electric plant, but they have not been well suited to automatic idling control of the plant. Also, there is another defect of such systems, i. e., one encountered in the case of extremely brief disconnections of load, wherein the control system would not respond to the re-connection of load until the engine has decelerated to almost zero velocity. A still further defect of prior art systems has been a requirement for special design and adjustment of the voltage relay to assure that the switching interval in switching from the initial circuit to the running circuit is very brief, even to the extent of closing the running circuit before the initial circuit is opened. One reason why the prior art relay control systems have been found extremely deficient, and unadaptable for use with idling systems is that it would be necessary to design and adjust the voltage relay on a closer differential than is practical.

It is the principal object of the present invention to provide a cooperating circuit relationship between the load relay and the voltage relay whereby loss of energization on the part of the load relay will interrupt immediately the energization of the voltage-relay. While the loss of the adequate operative energization of the load relay naturally is a certainty upon termination of load, it may occur from other causes, such as momentary poor connection in the load circuit, or sluggish action on the part of the voltage relay (i. e., unduly long interval between disconnection of the initial energization circuit and connection of the main running circuit). This sluggish action of the voltage relay is a natural tendency since the relay is gradually energized, and the sluggishness becomes more pronounced under such conditions as excessive contact wear, laborious engine acceleration, and from other causes. By employing the present invention the relay control system is made to operate properly in spite of such not unusual difficulties. The loss of adequate operative energization for the load relay in the present invention always results in a re-alignment of elements so that under all operating conditions both relays are always reset practically instantly to their proper effective positions. Thus, the load relay cannot drop out and result in a slow-down of the engine, and the voltage relay will drop out instantaneously when a disconnection of load occurs.

It is also an object of the present invention to eliminate the need for the design or adjustment of the voltage relay to effect a fast switching operation. A still further object of the invention is to provide a relay control system which is particularly suitable for use with a current transformer of particular design and a rectifier, as the elements for providing the holding energization of the load relay, the elements being described in co-pending application Serial No. 559,860, filed on January 18, 1956, by William E. McFarland.

Figure 2:
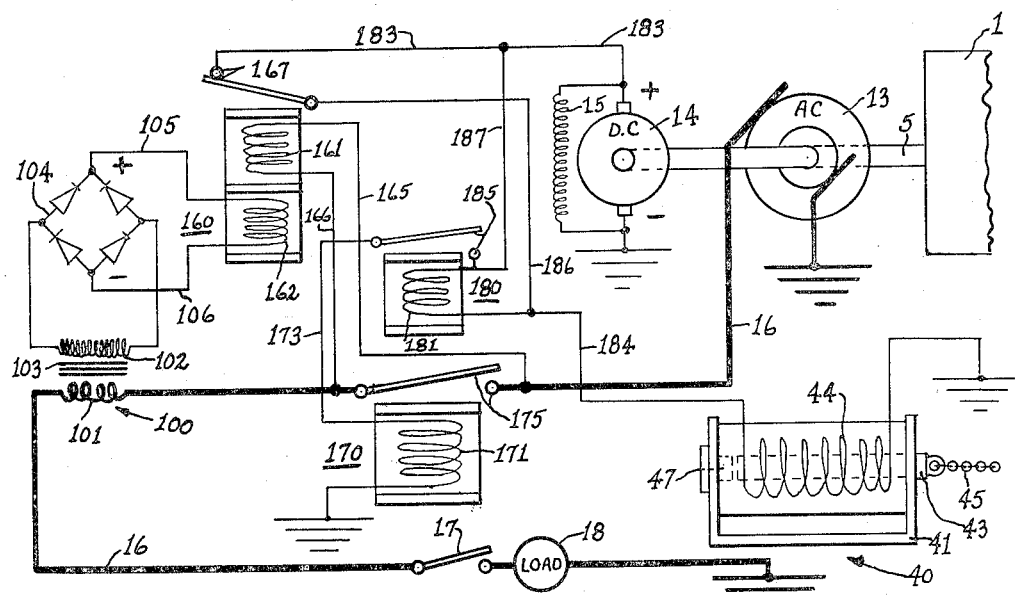
Figure 3:
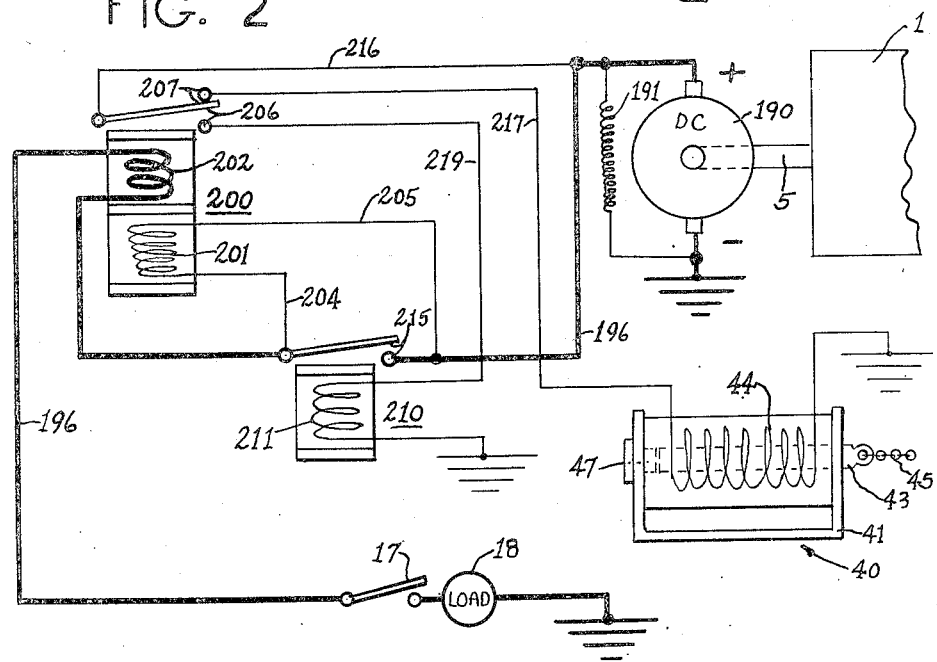
Figure 5:
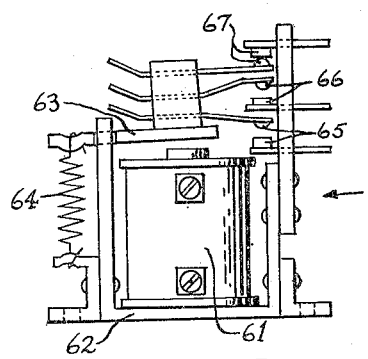
Figure 4:
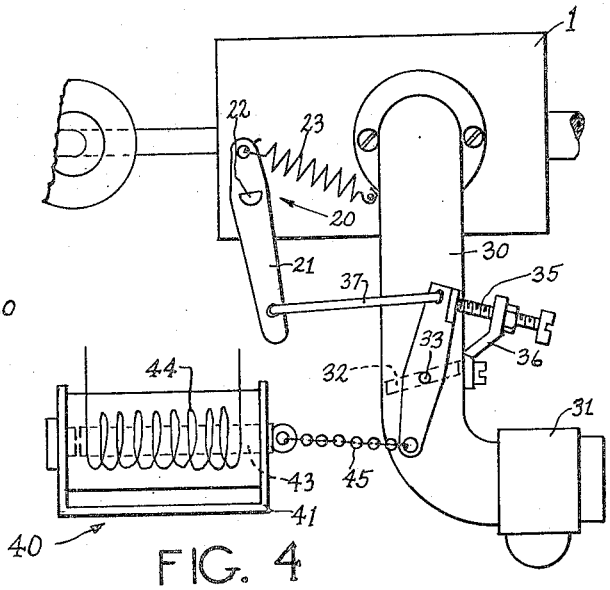
Figure 7:
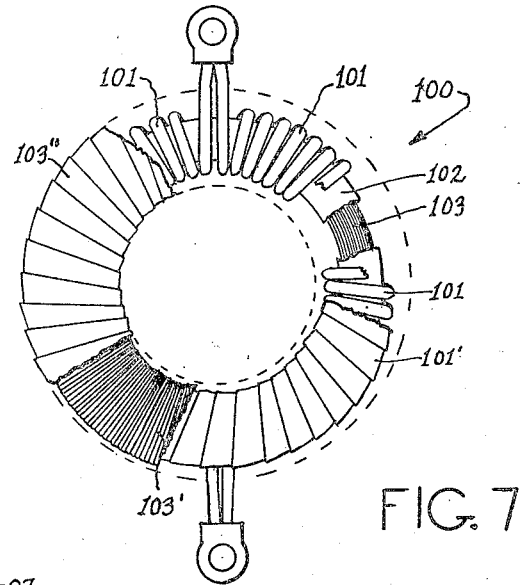

The invention will be more readily understood by reference to the accompanying drawings in which Figure 1 is a schematic circuit diagram depicting a combination start-and-stop arrangement as well as an idling control system for an engine-generator plant embodying the relay control system of the present invention. Figure 2 illustrates similarly a relay control system wherein a portion of the engine is omitted, said system being specifically modified for the condition where only an idling electromagnet is controlled by the relay system. Figure 3 is similar to Figure 2, but illustrates an additionally modified circuit arrangement. Figure 4 depicts positions of required engine parts and an idling electromagnet at the period when the control effect is to idle the engine. Figure 5 illustrates a side view of a typical electromagnetic switching relay suitable as the load relay of the relay control system of the present invention, while Figure 6 similarly presents a relay suitable as a voltage relay for the purposes of this invention. Figure 7 depicts a plan view of a current transformer suitable for use as a component of the Figures 1 and 2 systems.

Referring again to the drawings and particularly to Figure 1, numeral 1 represents an internal combustion engine with only certain essential elements shown. The engine may be a gasoline-driven unit having magneto ignition system 2 with breaker points 3 which can be grounded to stop the engine. Shaft 5 connects the engine to drive A. C. armature or generator 13 and a D. C. armature or generator 14. Shunt field 15 may serve both armatures. The A. C. load generator 13 serves load circuit 16 which latter includes one or more load switches 17 and load appliances 18. There is an additional (optional) load circuit 26 which includes one or more switches 27 and loads 28. The latter circuit has no effect on the relay control system.

Engine 1 has a load governor 20. The usual governor centrifugal mechanism is not illustrated and may be disposed within the crankcase, with a rocker shaft 22 serving to connect the mechanism with governor operating arm or lever 21. Loading spring 23 opposes the action of the centrifugal mechanism. The engine has a fuel intake pipe 30, carburetor 31, and throttle valve 32 pivoted within intake pipe 30 at 33. Throttle arm 34 serves to connect throttle valve 32 with governor lever 21 by means of rigid link 37. Stop screw 35 coacts with arm 34 to limit the closing of throttle 32 to insure the necessary engine fueling during forced idling condition. An idling electromagnet or solenoid 40 has a main iron frame 41, plunger 43, operating winding 44, and fixed iron core or stop 47. A chain 45 connects the outward end of plunger 43 with the lower end of throttle arm 34 so that, when winding 44 is operatively energized, plunger 43 will be moved inwardly whereby chain 45 is held taut and the engine is forced to idle at reduced speed. When winding 44 is de-energized, electromagnet 40 is of no effect, so that governor 20 controls the engine for uniform load speed operation.

Relay 50 is a contactor type relay adapted for closing the engine-cranking circuit, and it has operating winding 51, armature 53 and contacts 57. Relay 60 is the load relay. Figure 5 illustrates one suitable type of load relay for this purpose. This relay 60 has operating winding 61, main iron frame 62, armature 63, return spring 64, and contacts 65, 66 and 67. Another relay 70 has an operating winding 71 and contacts 77.

Figure 6:
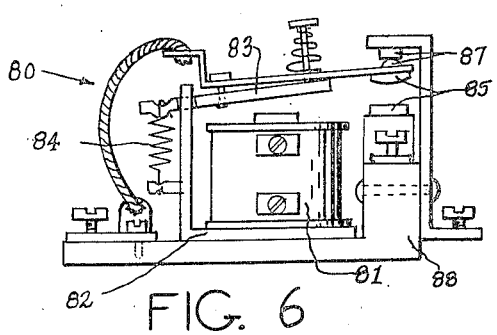

The voltage relay 80 shown in Figure 1 may be of various types. One type, suitable for small size plants, is shown in Figure 6. This relay includes an operating winding 81, main iron frame 82, armature 83, return spring 84, contacts 85 (which have an ampere-rating adequate to carry the load current), a smaller set of contacts 87 disposed in normally-closed arrangement, and an insulating base 88.

An engine cranking circuit 91 (Fig. 1) is connected with the positive terminal of a storage battery 90, and includes relay contacts 57, a series-connected cranking field 92 (which aids D. C. armature 14 in operating as a cranking motor), the cranking circuit passing through armature 14 and returning through ground to the battery-negative side.

The holding energization for load relay winding 61 is provided by current transformer 100, and a selenium rectifier 104. It is considered necessary in automatic control systems that the load relay be held energized even by very small load currents. The transformer means for effecting holding energization, illustrated and described herein, insures an always-adequate but never-excessive energization. Figure 7 illustrates a suitable transformer in which numeral 103 represents a toroidal (tape wound) high permeability core having a small sectional area, such as 0.10 sq. in. Insulation 102 covers the core on which cover is wound the two parallel sections of primary winding 101, each carrying half of the load current. Insulation 101' covers the primary, over which is wound a secondary winding 103', which is a few hundred turns of small wire, over which is placed an outer covering 103''. Transformer 100 basically is designed as a fractional-watt transformer except that the core length is made sufficient to accommodate the necessary high capacity primary winding. The resistance value of relay operating winding 61 (Fig. 1) necessarily is selected so that relay 60 will respond properly to its initial energization which is provided by battery current. However, certain relationships must exist between winding 61, rectifier 104, and transformer 100. The voltage rating and internal resistance characteristics of the rectifier must be selected so that the rectifier does not appreciably begin to pass reverse current until the transformer is operating beyond the point of core saturation (when it is producing significant peak voltages). The transformer is impedance-matched to relay winding 61 on the basis of a very small current flow in circuit 16, with the objective of obtaining the optimum possible energization of the relay at the value of circuit flow at which the match is made. The making of the impedance match at a low point of circuit current flow results not only in the greatest obtainable sensitivity in the system, but also results in the fewest practical number of secondary winding turns, thus resulting in only moderately high peak voltage when circuit current flow is large and the transformer is being operated far beyond saturation. At the point of impedance match, relay winding 61 is only lightly energized, yet transformer core 103, because of the aforesaid overall design, is being operated well toward saturation. With greater current flow fed through primary winding 101, the relay still is lightly energized, because the effective impedance of winding 61 is progressively larger as the peak voltages become higher. The only significant adverse effect of the high peak voltage is some heating of rectifier 104 due to leakage current.

Wire 105 (Fig. 1) connects the positive terminal of rectifier 104 with winding 61, while wire 106 connects the negative terminal. The initial load relay energization circuit, starting from battery-positive, includes wire 110, switch 111 in solid line position, wire 112, wire 105, winding 61, wire 115, normally-closed contacts 87 of relay 80, then through transformer winding 101, load switch 17 when closed, load 18, and ground return to battery-negative. Battery 90 sometimes may be disconnected from the plant to enable more convenient portability, thus requiring manual cranking. In such case, switch 111 is placed in the broken line position to provide an alternate initial energization circuit. This latter circuit starts from the exciter generator-positive, through wire 120, battery 118, switch 111, wire 112, wire 105, winding 61, wire 115 and on through the load circuit (depicted by heavy lines) and on through ground return to generator-negative. Small battery 118 may be a dry cell battery and, in practice, will be included as an element only in such instances where the voltage of exciter generator 14 is inadequate in itself to insure the initial energization of winding 61. Both the first-described load relay initial energization circuit and the aforesaid alternate circuit are arranged to provide energization for winding 61 of the same polarity as that of the rectified holding energization. The rectifier blocks the passage of the battery current so that all the initial circuit current must pass through winding 61.

The energization circuit of operating winding 81 of the voltage relay is the particular subject of the present invention, and generally requires the inclusion of a separate contact 66 in the load relay for the purpose of the invention. The load-responsive relay of conventional electric plant control systems tends to be limited in its ability to operate several contacts, but the unique transformer arrangement described herein provides uniform energization of the load relay to such a degree that the addition of one more set of control contacts is not objectionable. This latter (normally-open) set of contacts 66 is connected directly in series with winding 81 of the voltage relay, the circuit starting from exciter positive, through wire 120, wire 12, contacts 66 when closed, wire 122, winding 81 and through ground return to the exciter-negative side. The design of relay 80 will be such that the relay will pull in to close contacts 85 only upon suitable engine acceleration, such as that required to raise exciter voltage to 85% or more of normal running voltage. The drop-out point of relay 80, however, may be quite low, so that the relay never tends to drop out during sudden overload conditions when generator voltage may dip momentarily.

Control of engine cranking is obtained by a circuit which starts from battery-positive, through wire 110, switch 111, wire 112, wire 105, normally-open contacts 65 of load relay 60, wire 116, normally-closed contacts 77 of cranking-stopping relay 70, wire 117, winding 51 of the main cranking relay, and through ground return to battery-negative. The cranking-stopping relay 70 has an operating winding 71 which is energized by shunt-connection across the A. C. generator, the circuit including an adjustable resistor 125 which enables adjustment of the pull-in point of the relay 70. This should be such speed and voltage as is reached only when the engine begins accelerating under its own power. It will be clear that contacts 57 close to start the cranking cycle as soon as relay 60 closes its contacts 65. Relay contacts 57 must open following the sufficient energization of winding 71 to open its contacts 77. The design of relay 70 will be such that, once contacts 77 become open they will remain open, i. e., they will not close even upon lowered energization of winding 71 during idling speed operation, but they will close if the engine is brought to a complete stop.

The energization circuit of idling electromagnet 40, beginning from the positive side of exciter generator 14, includes wire 126, winding 44 of the idling electromagnet, wire 127, switch 128 when in solid-line position, wire 130, normally-closed contacts 67 of the load relay, and through ground return to exciter-negative. A circuit for grounding of ignition contacts 3 (to stop the engine) can become effective only when switch 128 is placed manually in the broken line position, this circuit starting with contacts 3, then through switch 128, wire 130, normally-closed contacts 67 and through ground.

Positions of the elements shown in Figure 1 are those with the engine stopped, and only load 27 connected, switch 128 being in that position where the engine will be started automatically on connection of first load 18, and the engine will be idled from termination of first load 18 to initiation of second load 18. Load 18 is not necessarily a "working" load, but may be merely a lamp that is used to obtain a response. Usually, however, load 18 will be the working load. Many plants, such as 115/230 volt plants and 3-phase plants, have more than one load circuit from the load generator, and load 28 therefore is representative of loads which are not (or perhaps cannot) be connected to obtain automatic response of the relay control system.

Load relay 60 is energized by the battery circuit as has been described, on closing load switch 17. This effects reversal of the shown positions for contacts 65, 66 and 67 (Fig. 1) to control the several circuits which result in starting and accelerating the engine. Upon such energization, contacts 67 open to prevent energization of electromagnet 40. Contacts 66 close the energization circuit of relay 80. Contacts 65 close to effect closing of main cranking contacts 57, and the engine is revolved for starting. As the engine fires under its own power and exceeds cranking speed, contacts 77 open and then cranking contacts 57 also open. Throttle valve 32 remains open until load speed is reached, with governor 20 thereafter serving to maintain uniform load speed. Since switch 27 is illustrated as closed, a gradually rising A. C. voltage will be applied to load 28, the effect of which may be to retard the engine acceleration rate, but, so long as the contact positions of relay 60 are not again reversed, the acceleration must continue to such point that the voltage relay 80 must pull-in. Relay 80, however, may easily have two natural faults: one being that the motion of armature 83 may be rather slow due to the gradualness of the relay's energization, and the other one being that there may be a "creepage" effect with respect to contacts 87 so that there may be an interval where the contacts are apparently touching but where there is no working pressure and the contacts are not actually functioning. Relay 60 is not one which loses its effective energization at the instant the initial battery energization circuit is interrupted, as it will hold its armature 63 down briefly thereafter. No actual delaying expedient such as the usual delay ring is illustrated for relay 60, but the fact that rectifier 104 is always connected across winding 61 provides a slightly deferred loss of energization of the relay sufficiently adequate to cover a reasonable switching interval of relay 80.

However, the temporary non-functioning of contacts 87, or, in any event, a long interval between the opening of contacts 87 and the closing of contacts 85 will result in a loss of energization of relay 60, i. e., loss of energization to the extent where at least contact 66 begins to open and the relay is in the act of dropping out. The consequence of a full drop-out of relay 60 at this point tends to be serious, as the closing of contact 67 will effect deceleration of the engine. In the event that the drop-out of relay 60 occurs just as armature 83 (Fig. 6) of relay 80 is definitely starting downwardly, relay 80 (if there were no interruption of its energization circuit)

could, perhaps, complete its pull-in operation. Even so, the transformer energization of relay 60 may be inadequate to effect a new pull-in of relay 60 so as to prevent engine deceleration. The design and arrangement of transformer 100 is that of almost level output but it is a small output and not necessarily sufficient to pull in relay 60 and it is impossible also for the transformer to provide its normal output if load 18 is the smallest load, such as one small lamp. Therefore, it is desirable to assure that relay 60 cannot complete a drop-out and thus decelerate the engine at the wrong time. This condition has been somewhat offset in the prior art by designing relay 80 for fast switching action; for example, by closing the running circuit before interrupting the initial circuit. However, this complicates the design and adjustment and, besides, in the circuit of Figure 1, there must necessarily be a switching interval. Thus, if relay 80 were constructed for a "make-before-break" arrangement, contacts 87 and 85 would both be closed momentarily. Full voltage A. C. current then would flow from one side of the generator, through contacts 85, then through contacts 87, wire 115 and through wire 106, reaching the rectifier. The current, therefore, may pass through the rectifier, wire 112, switch 111, wire 110, battery 90 and through the ground return to the opposite side of the A. C. generator. Obviously, rectifier 104 would be readily destroyed by the current flow as its breakdown in one direction would result from even a few volts.

The circuit arrangement of Figure 1 is such that a definite switching interval or even some contact creepage of relay 80 will not interrupt or disturb smooth operation of the system. If relay 60 has a sufficient loss of energization during the switching interval of relay 80, contacts 66 will cease to function just as armature 63 (Fig. 5) begins to rise. This instantly interrupts the energization of winding 80 and permits a new and full-pressure seating of contacts 87. In turn, the initial battery energization of relay 60 is restored, and this is an extremely fast cycling action so that there is no tendency for the partial drop-out of relay 60 to cause engine deceleration. The restoration of energization of relay 60 insures reclosing of contacts 66 to restore the energization of relay 80, and by this time, or at least after several repetitions of the action, relay 80 will be enabled to complete the switching operation without an abnormal interval between the opening of contacts 87 and the closing of contacts 85. The arrangement is one by which relay 60 cannot appreciably interfere with the acceleration of the engine so long as switch 17 is closed, and also one by which relay 80 will be given repeated opportunities (if necessary) for completing its switching action within a normal interval. At least when acceleration has continued to the point where the energization of relay 80 is definitely adequate, armature 83 of relay 80 will reach the pulled-in position (that wherein contacts 85 are closed and contacts 87 are open) prior to the effective loss of energization of relay 60, i. e., while contacts 66 are still closed. Upon the closing of contacts 85 there is no further problem with respect to the switching operation because the output of transformation 100 will hold the energized status of relay 60 and load 18 will be served as well as load 28. If, however, due to faulty circuit connections, there is brief interruption of flow through load 18, relay 60 will drop out and, in turn, relay 80 also will drop out. The faulty circuit through load 18 might be corrected almost instantly, in which case engine deceleration would not have progressed appreciably. As quickly as the faulty circuit connection is overcome, relay 60 will be pulled in positively by benefit of battery current, and instantly thereupon, relay 80 will be energized and its armature will be pulled down to again serve load 18. Thus, the switching status always reverts, at least momentarily, to the initial (battery) energization circuit at any time that there are circuit or switching difficulties, and transformer 100 is not even required to have design characteristics for pull-in energization of relay 80, with consequent simplification and cost saving with respect to the transformer design.

The desirable positive and trouble-free operation of the engine control system as a whole (in Fig. 1) is in a large part due to the convenient means of using one contact of load relay 60 as a means of instantly interrupting the energization of voltage relay 80 whenever the load relay has a loss of energization.

Loads 18 and 28 will be properly served only until such time as load switch 17 is opened when still further advantages of the present invention will appear. In some instances, switch 17 may, by intention, be opened only very momentarily, this being especially true in the case when load 18 is a portable power tool with a trigger type switch, and the operator may find it desirable to open and then quickly close the switch. Relay 60 necessarily drops out for this open-switch condition, but, providing that this interval is short, the engine will not have decelerated appreciably. It is most desirable that the plant does not have to decelerate to some slow engine speed before the control relays can reset themselves to respond to the closing of switch 17, and, in the circuit arrangement of Figure 1, there is no waiting for the resetting of the relays, and power will always be provided for load 18 as soon after closing of switch 17 as is practically possible. If the engine has decelerated only to a slight degree during this interval, the relay system will act instantly, that is, relay 60 will instantly pull in by benefit of the initial (battery) circuit, following which relay 80 will instantly pull in to restore the running circuit.

Still further advantages appear when switch 17 is opened for a long period. The resulting loss of energization of relay 60 effects the closing of contacts 67 which completes the described energization circuit for idling electromagnet 40. Plunger 43 is pulled inwardly as the momentary energization of winding 44 is strong. This establishes the plunger, throttle and governor positions as indicated in Figure 4 forcing the engine to decelerate, and plunger 43 will be held inwardly because the magnetic circuit of electromagnet 40 at least is substantially closed. The engine, therefore, will be idled slowly.

Contacts 66 necessarily are open at this stage of operation, so that relay 80 is dropped out and is in readiness to assure the effectiveness of the initial circuit when switch 17 again is closed. It will be apparent that, except for the expedient of the interruption of the energization of relay 80, the latter would not drop out until and unless sufficient engine deceleration occurred. The most desirable design of relay 80 is that of a normally simple relay which operates on an ordinarily wide differential. Thus, it will not drop out during undervoltage due to momentary overload. In the circuit arrangement of Figure 1, there is no objection to the use of a relay having a normally wide differential between pull-in and drop-out. In other circuit arrangements, however, relay 80 would have to be a relatively close differential device (such as a frequency-responsive relay or a mechanical speed-responsive relay) to assure definite drop-out during idling speed operation, especially since a relatively fast engine idling speed may be desired.

When the engine is operating at a slow idling speed, and switch 17 is next closed, the initial energization of relay 60 is by battery and not by the energization from transformer 100 (which would be less adequate, considering the low frequency prevailing at idling speed). The pull-in of relay 60 assures the opening of contacts 67 with consequent acceleration to load speed.

It will be apparent that the operation of the two control relays 60 and 80 is similar whether switch 128 is in the solid or the broken-line position. As has been described, and with the switch in the solid-line position, the engine is started on the first closing of switch 17, but is never stopped. Switch 128 may be placed in the broken-line position, in which case the magneto ground circuit is effective to stop the engine upon more than a brief loss of energization by relay 60. Thus, the engine will be started and accelerated to running speed each time switch 17 is closed, and stopped completely each time the same switch is opened, and no adjustments or changes of the control relays are required.

If battery 90 is not available, the engine must be cranked manually, so switch 111 will be placed in the broken line position. Once the engine has been started, the operation will be as previously described, with the exception that the initial energization of relay 60 is provided by benefit of the exciter generator voltage (as assisted by dry cell battery 118 where assistance is required). No change or adjustment of the relay system is necessary. During the acceleration phase, the rise of exciter voltage may tend to over-energize relay 60 but the period will be very brief and the relay and rectifier 104 will easily withstand the applied voltage.

Figure 2 illustrates the present invention as applied to an A. C. generator set in which the relay control system is designed only for idling the engine when load demand has ceased, and this figure indicates modifications within the principles of the invention. The fuel intake and other engine parts omitted from the diagram should be assumed to be the same as in Figure 1. The load relay is indicated by numeral 160 and comprises separate operating windings or coils 161 and 162 for the initial and holding energization circuits, respectively. A. C. is shown as used for the purpose of initial energization. This circuit, starting from one side of the A. C. generator, passes through a portion of load circuit 16, then through wire 165, operating winding 161, wire 166, on through the load circuit and switch 17, load 18, and returning through the ground. Thus, if the plant is operating even at idling speed, and switch 17 is closed, an A. C. energization of winding 161 will occur and this will effect the opening of the normally-closed contacts 167. Operating winding 162 is energized by a transformer and rectifier circuit identically as in Figure 1. The voltage relay of Figure 2 is designated as 180, and includes operating winding 181 and normally-closed contacts 185.

In Figure 1, speed-responsive relay 80 was shown to effect directly the main switching operation, whereas in Figure 2, a separate relay or contactor 170 is provided, and relay 170 is under the control of voltage relay 180, so that the function of the two relays in Figure 2 is equivalent to the function of the one relay 80 of Figure 1. The energization circuit of voltage relay 180, starts from the positive exciter generator terminal, through wire 183, winding 180, wire 184, winding 44 of the idling electromagnet, and through ground return to the exciter-negative side. It will be understood that relay 180 may be quite a small device as compared to the relatively powerful electromagnet 40, and, in addition, the relay is not required to be effectively energized until exciter voltage approaches normal. For these reasons, winding 181, may be of extremely high resistance, compared to that of winding 44 of the idling electromagnet, and therefore, at such time as winding 180 is connected in series with winding 44, as just described, the condition will be such that winding 181 is effectively energized (for pull-in) when exciter voltage rises sufficiently, while winding 44 at that time will be less than functionally energized. In one sense, therefore, winding 181 serves as a high resistance element which may be inserted in series with or removed from the in-series connection with the idling electromagnet as a means of controlling the idling electromagnet through use of normally-closed switching contacts. At such time, as the normally-closed contacts 167 are closed (which will be for the off-load period), operating winding 181 is necessarily short-circuited by means of the circuit including wires 186 and 183—187. This assures that the exciter voltage is applied directly to the electromagnet winding 44 during the off-load period, and the engine will be idled. In addition, however, normally-closed contacts 167 provide another function, which is the subject of the present invention, and that is for interruption of the energization of the voltage-relay, excepting for such periods as load relay 160 is effectively energized. It will be obvious that the energization circuit for winding 181 is in effect at such time as the load relay contact 167 is open, but that once contact 167 closes (either momentarily from circuit disruption, or for a longer period due to disconnection of load), the energization of winding 181 is interrupted by the described short-circuit. The particular short-circuit arrangement of Figure 2 is one which avoids the necessity of including a normally-open contact in the load relay. In Figure 2, the initial energization of the load relay is by A. C. which is of low frequency (due to the slow engine speed) and relay 160 will therefore have limited ability to operate two separate contacts for the two required switching functions.

Other than the relative inability to operate two contacts, the A. C. energization of load relay 160 is fully efficient for initial energization, whereas, as indicated in Figure 1, the exciter voltage frequently may be too low a voltage, in which case boosting batteries would be required and these often are objectionable.

Speed responsive relay 180 will close contacts 185 at such a moment as contacts 167 are open and the engine is approaching load speed. Closing of contacts 185, in turn, closes the circuit to the operating winding 171 of the separate relay or contactor 170. The latter circuit starts from the exciter positive terminal, thence through wire 183, contacts 185 when closed, wire 173, winding 171, with ground return. The design is such that when exciter voltage is sufficiently high to pull in relay 180, the voltage is definitely more than sufficient to pull in relay 170.

The operation of the structure of Figure 2 therefore is as follows: The engine is in the idling condition as illustrated, contact 167 is closed, plunger 43 is pulled fully inwardly assuring engine idling. On closing switch 17, the described A. C. circuit will provide the initial circuit energization for winding 161. Contact 167 then opens, opening the short circuit around winding 181, and plunger 43 releases the throttle-closing pull to accelerate the engine. As the voltage of exciter generator 14 rises during acceleration, winding 181 is sufficiently energized to close contact 185 of the voltage relay and, in turn, contact 175 must close in response to the immediate energization of winding 171. The closing of contact 175 provides the two functions, one being the interruption of the initial energization circuit, as accomplished by short-circuiting winding 161, and the other being the closing of the circuit from the A. C. generator to the load. With the load circuit thus established, the operating winding 162 is provided with holding energization, and contacts 167 remain open to assure load speed.

It will be observed that windings 161 and 162 are components of the same relay and thus act upon the same magnetic circuit. Since winding 161 is A. C.-energized, and winding 162 is energized by unipolar current, it may sometimes happen that there is an instantaneous conflict between the windings just at the moment that contacts 175 close. When winding 161 is short-circuited, the residual energization drains off slowly, and winding 161 can provide opposition to winding 162 so that contacts 167 will close and may fail to reopen, at least in the event that load 18 is the smallest permissible load. Such a closing of contact 167, however, interrupts energization of winding 181, so that contacts 185 and 175 both open and the initial energization circuit is re-instated to obtain a new energization of winding 161. This, however, is only an instantaneous energization, because contact 167 is again instantly opened and, in turn, both contacts 185 and 175 must close to again close the load circuit, and probably the polarities of windings 161 and 162 will not be in conflict on the new attempt. But, if necessary, still additional recycling of the relays will occur until the load circuit is closed successfully. As in Figure 1, the load relay has a switching contact arranged to interrupt the energization circuit of the voltage relay immediately upon loss of energization of the load relay, whether the loss is momentary (because of circuit difficulties or due to disconnection of load), and the voltage relay necessarily effects opening of the load circuit and reversal of the interruption of the initial energization circuit. The operation of the system is made practical and positive, and there is no possibility of the voltage relay failing to establish promptly the initial circuit in readiness for connection of a new load, and there is no need for the voltage relay to be designed to drop out on a critically close differential.

Figure 3 illustrates the present invention as used in an idling application similar to that of Figure 2 and with the load relay obtaining holding energization by direct series-connection with the load circuit rather than through a transformer arrangement as in Figures 1 and 2. While the direct method of energization is not limited to D. C., and the same diagram would serve for A. C. purposes, a D. C. load generator 190 with shunt field 191 is illustrated. Load circuit 196 includes load switch 17 and load 18. The load relay is indicated by numeral 200, and includes the initial operating winding 201 and the holding winding 202, and also includes normally-open and normally-closed contacts 206 and 207, respectively. The voltage relay is indicated by numeral 210 and includes operating winding 211 and normally-open contacts 215. The initial energization circuit starts from the positive terminal of the load generator 190, through load circuit 196, wire 205, initial operating winding 201, wire 204, holding winding 202, circuit 196, load 17, switch 18 and through ground return. Winding 201 is a fine wire high resistance winding designed to effect suitably powerful initial energization from the small initial load circuit current flow.

The energization circuit for voltage relay 210 starts from the exciter positive terminal, through wire 216, normally open contacts 206 of the load relay, wire 219, winding 211, and through ground return. As in the prior figures, voltage relay 210 necessarily is in the dropped-out position, with contacts 215 open, except when relay 200 is energized, and also when the generated voltage of generator 190 has approached sufficiently normal running voltage to pull in relay 200.

The operation of the structure illustrated in Figure 3 is as follows: The positions of the elements are those of engine-idling with electromagnet 44 being energized by the voltage generated at idling speed to hold inwardly plunger 43, the throttle being closed to idling position as in Fig. 4. On closing load switch 17, winding 201 is sufficiently energized to pull in relay 200, thus opening contacts 207 and closing contacts 206. Simultaneously, idling electromagnet winding 44 is de-energized (effecting the acceleration of the engine), and the energization circuit to winding 211 is established, so that relay 210 will pull in during acceleration after sufficient voltage rise. The pull-in of relay 210 results in closing contacts 215, thus placing a short-circuit around winding 201 to interrupt the initial energization circuit, and at the same time connect the load generator with the load circuit so that the running circuit is established. It is only necessary with respect to the coarse holding winding 202 that there be sufficient current flow to hold the pulled-in status of relay 200. Under the condition of small load current flowing, the energization of winding 202 will be ineffective to obtain a pull-in of the relay. But, if for any reason, such as a poor contact in the load circuit, relay 200 should drop out (without intentionally disconnecting load 18), the resulting opening of contacts 206 will immediately assure the opening of contacts 215, thus enabling winding 201 to reset relay 200 to the pulled-in position and with only a fraction of a second interruption in the service to the load.

I claim:

1. In an automatic relay control system for at least reducing engine speed of an internal combustion engine-generator set from the termination to initiation of load demand in a load circuit provided with at least one load appliance switch, said control system including a load-responsive switching relay having switching contacts serving to effect at least deceleration, or at least acceleration, of the engine in accordance with de-energization or energization, respectively, of said relay, said system also including a voltage-responsive switching relay having an operating winding and an energization circuit therefor, said load-responsive relay having at least one operating winding for its energization, an initial energization circuit for said latter winding which circuit is connectable-disconnectable in series with the load circuit to make the initial circuit effective for energizing said latter winding upon closing of a load appliance switch, a holding energization circuit for energizing a winding of the load-responsive relay by drawing the holding energy from the load circuit current flow to hold the load-responsive relay energized for the duration of load circuit current flow after the load generator is connected with the load circuit, said voltage-responsive relay being designed to be responsive to rise of generated voltage to a predetermined high value to interrupt the initial energization circuit and at the same time connect the load generator to the load circuit, the improvement wherein the energization circuit for the operating winding of the voltage-responsive relay, which already is connected to the operating winding of the voltage-responsive relay, also is connected to one contact of the load-responsive relay and is arranged so that the energization of the voltage-responsive relay is interrupted immediately upon any loss of operative energization by the load-responsive relay, and said energization of the voltage-responsive relay is restored immediately upon recovery of operative energization by the load-responsive relay.

2. An automatic relay control system according to claim 1 in which the energization circuit of the voltage-responsive relay comprises a shunt-connection with one generator driven by the engine, and in which the load-responsive relay includes normally-open contacts in series with the energization of the voltage-responsive relay, whereby the latter circuit is interrupted immediately upon the opening of said normally-open contacts.

3. An automatic relay control system according to claim 2 in which the holding energization circuit for energizing a winding of the load-responsive relay comprises a current transformer and a rectifier, with the current transformer having a primary winding connected in series with the load circuit, and having a secondary winding connected through the rectifier to the winding of the load-responsive relay, and in which said transformer has a high permeability core of small cross-sectional area, and in which the transformer and the operating winding of the load-responsive relay are impedance-matched at a very small value of load circuit current flow, whereby the transformer is operated beyond saturation at larger load circuit current flow resulting in a relatively level energy output to said operating winding.

4. An automatic relay control system according to claim 3 in which the engine-generator set includes an idling electromagnet and cranking means including a starting battery, and in which the control system includes a manually-selective switch whereby, in one position of said switch, the contacts of the load-responsive relay serve to effect only deceleration or acceleration of the engine in accordance with de-energization or energization of the latter relay, respectively, and whereby, in another position of said selective switch, the contacts of the load-responsive relay serve to effect deceleration and stopping of the engine upon de-energization of the load-responsive relay and to effect starting and acceleration of the engine upon energization of the load-responsive relay.

5. An automatic relay control system according to claim 4 in which said initial energization circuit includes said starting battery as the energization source for said circuit, and said control system includes an alternate initial energization source comprising a driven generator serving as the energization source for the load-responsive relay, and also includes a manually-operated switch for selectively connecting either of said energization sources with the remainder of said initial energization circuit.

6. In an automatic relay control system for stopping the engine of an internal combustion engine-generator set upon termination of load demand in a load circuit provided with at least one load appliance switch, and for starting the engine upon initiation of load demand, said engine-generator set including a starting battery, said control system including a load-responsive switching relay having switching contacts serving to effect stopping and starting of the engine, respectively, in accordance with de-energization and energization of said relay, said system also including a voltage-responsive relay having an operating winding and an energization circuit therefor, said load-responsive relay having at least one operating winding for its energization, an initial energization circuit for said latter winding and originating from said battery and connectable-disconnectable in series with the load circuit to make the initial circuit effective for energizing said latter winding upon closing of a load appliance switch, a holding energization circuit for energizing a winding of the load-responsive relay by drawing the holding energy from the load circuit current flow to hold the load-responsive relay energized for the duration of load circuit current flow after the load generator is connected with the load circuit, said voltage-responsive relay being designed to be responsive to rise of generated voltage to a predetermined high value to open the initial energization circuit and at the same time connect the load generator to the load circuit, the improvement wherein the energization circuit for the operating winding of the voltage-responsive relay comprises a shunt connection with a driven generator, which circuit already is connected to the operating winding of the voltage-responsive relay, and wherein the load-responsive relay has normally-open contacts connected in series with the energization circuit of the voltage-responsive relay so that the energization of the voltage-responsive relay is interrupted immediately upon any loss of operative energization by the load-responsive relay, and said energization of the voltage-responsive relay is restored immediately, upon recovery of operative energization by the load-responsive relay.

7. An automatic relay control system according to claim 6 wherein said load-responsive relay has only one operating winding for its initial energization and for its holding energization, said winding being permanently connected in said initial energization circuit and to said battery, and wherein said holding energization circuit comprises a current transformer and a rectifier, with the current transformer having a primary winding connected in series with the load circuit, and having a secondary winding permanently connected through the rectifier to the winding of the load-responsive relay, and in which said transformer has a high permeability core of small cross-sectional area, and in which the transformer and the operating winding of the load-responsive relay are impedance-matched at a very small value of load circuit current flow, whereby the transformer is operated beyond saturation at larger load circuit current flow resulting in a relatively level energy output to said operating winding.

8. In an automatic relay control system for reducing the engine speed of an internal combustion engine-generator set from the termination to the initiation of load demand in a load circuit provided with at least one load appliance switch, said control system including a load-responsive switching relay having switching contacts serving to effect control of an electromagnetic idling device having an operating winding for obtaining idling speed operation of the engine in accordance with de-energization of the relay, and load speed operation of the engine in accordance with energization of the relay, said system also including a voltage-responsive switching relay having an operating winding and an energization circuit therefor, said load-responsive relay having at least one operating winding for its energization, an initial energization circuit for said latter winding which circuit is connectable-disconnectable in series with the load circuit to make the initial circuit effective for energizing said latter winding upon closing of a load appliance switch, a holding energization circuit for energizing a winding of the load-responsive relay by drawing the holding energy from the load circuit current flow to hold the load-responsive relay energized for the duration of load circuit current flow after the load generator is connected with the load circuit, said voltage-responsive relay being designed to be responsive to rise of generated voltage to a predetermined high value to interrupt the initial energization circuit and at the same time connect the load generator to the load circuit, the improvement wherein the energization circuit for the operating winding of the voltage-responsive relay, which already is connected to the operating winding of the voltage-responsive relay, also is connected to one contact of the load-responsive relay and is arranged so that the energization of the voltage-responsive relay is interrupted immediately upon any loss of operative energization by the load-responsive relay and said energization of the voltage-responsive relay is restored immediately upon recovery of operative energization by the load-responsive relay.

9. An automatic relay control system according to claim 8 in which the initial energization circuit includes the load generator as the energization source, and in which the voltage-responsive relay has normally-open contacts for connecting the load generator to the load circuit, and in which the initial energization circuit comprises a connection of the terminals of a winding of the load-responsive relay across said normally-open contacts so that said latter winding is short-circuited by the closing of said contacts thereby interrupting the initial energization circuit and at the same time connecting the load generator to the load circuit.

10. An automatic relay control system according to claim 9 in which the voltage-responsive relay comprises a system of two relays, one of which is a slave relay serving to connect the load generator with the load circuit.

11. An automatic relay control system according to claim 8 in which the initial energization circuit includes a driven generator as the energization source, and in which the winding of the voltage-responsive relay is a high resistance winding connected in series with the winding of the idling device which latter winding is a low resistance winding, and in which system the load-responsive relay has normally-closed contacts connected across the terminals of the winding of the voltage-responsive relay in a manner so as to short-circuit said winding when said contacts are closed upon loss of energization of the load-responsive relay to thus interrupt immediately the energization of the voltage-responsive relay, and at the same time to effect operative energization of the idling device and to relieve the short-circuit of said winding when said contacts are opened upon recovery of energization of the load-responsive relay to thus restore immediately the energization of the voltage-responsive relay, and, at the same time effect the operative de-energization of the idling device.

12. An automatic relay control system according to claim 8 in which the holding energization circuit for energizing a winding of the load-responsive relay comprises a current transformer and a rectifier, with the current transformer having a primary winding connected in series with the load circuit, and having a secondary winding connected through the rectifier to the winding of the load-responsive relay, and in which said transformer has a high permeability core of small cross-sectional area and in which the transformer and the operating winding of the load-responsive relay are impedance-matched at a very small value of the load circuit current flow, whereby the transformer is operated beyond saturation at larger load circuit current flow resulting in relatively level energy output to said operating winding.

13. An automatic relay control system according to claim 12, in which said load-responsive relay has only one operating winding for its initial energization and for its holding energization, said winding being permanently connected in said initial energization circuit, and wherein the secondary winding of the transformer is permanently connected through the rectifier to the winding of the load-responsive relay.

References Cited in the file of this patent

UNITED STATES PATENTS

| | | |
|---|---|---|
| 1,704,996 | Witzel | Mar. 12, 1929 |
| 1,866,494 | Strong | July 5, 1932 |
| 2,611,877 | Walters | Sept. 23, 1952 |
| 2,762,933 | Foxcroft | Sept. 11, 1956 |